(12) United States Patent
Jalloul et al.

(10) Patent No.: US 9,258,161 B2
(45) Date of Patent: Feb. 9, 2016

(54) REFERENCE SIGNAL DESIGN FOR MASSIVE MIMO COMMUNICATION

(71) Applicant: Broadcom Corporation, Irvine, CA (US)

(72) Inventors: Louay Jalloul, San Jose, CA (US); Amin Mobasher, Sunnyvale, CA (US); Sirikiat Ariyavisitakul, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/839,544

(22) Filed: Mar. 15, 2013

(65) Prior Publication Data

US 2014/0161205 A1 Jun. 12, 2014

Related U.S. Application Data

(60) Provisional application No. 61/734,214, filed on Dec. 6, 2012.

(51) Int. Cl.
*H04L 27/26* (2006.01)
*H04L 5/00* (2006.01)
*H04L 5/12* (2006.01)

(52) U.S. Cl.
CPC .......... *H04L 27/2613* (2013.01); *H04L 5/0016* (2013.01); *H04L 5/0023* (2013.01); *H04L 5/0051* (2013.01); *H04L 5/0048* (2013.01); *H04L 5/12* (2013.01)

(58) Field of Classification Search
CPC ... H04L 5/0023; H04L 5/0048; H04L 5/0007; H04L 5/0014; H04L 5/0016
USPC .................. 375/260, 267; 370/210, 328, 329
See application file for complete search history.

(56) References Cited

U.S. PATENT DOCUMENTS

| | | | |
|---|---|---|---|
| 2009/0201849 A1* | 8/2009 | Sawahashi et al. | 370/328 |
| 2011/0134867 A1* | 6/2011 | Lee et al. | 370/329 |
| 2014/0016451 A1* | 1/2014 | Muruganathan et al. | 370/210 |
| 2014/0086195 A1* | 3/2014 | Jung et al. | 370/329 |
| 2014/0098689 A1* | 4/2014 | Lee et al. | 370/252 |

* cited by examiner

*Primary Examiner* — Daniel Washburn
*Assistant Examiner* — Eboni Hughes
(74) *Attorney, Agent, or Firm* — Sterne, Kessler, Goldstein & Fox, P.L.L.C.

(57) ABSTRACT

The present disclosure is directed to a system and method for extending a reference signal pattern to define additional reference signals using a phase division multiplexing (PDM) technique. The reference signal pattern can be a predefined reference signal pattern in a wireless communication standard and can be extended to support massive MIMO communication.

20 Claims, 9 Drawing Sheets

REFERENCE SIGNAL DESIGN FOR MASSIVE MIMO COMMUNICATION

CROSS REFERENCE TO RELATED APPLICATIONS

This application claims the benefit of U.S. Provisional Patent Application No. 61/734,214, filed Dec. 6, 2012, which is incorporated herein by reference.

TECHNICAL FIELD

This application relates generally to reference signal design and, more specifically, to reference signal design for multiple input-multiple output (MIMO) communication.

BACKGROUND

Multi-antenna techniques are used in communication systems to improve performance. These techniques rely on multiple antennas at the transmitter and/or receiver and can be grouped into three different categories: diversity, interference suppression, and spatial multiplexing. These three categories are often collectively referred to as MIMO communication even though not all of the multi-antenna techniques that fall within these categories require at least two antennas at both the transmitter and receiver.

Figure 1:
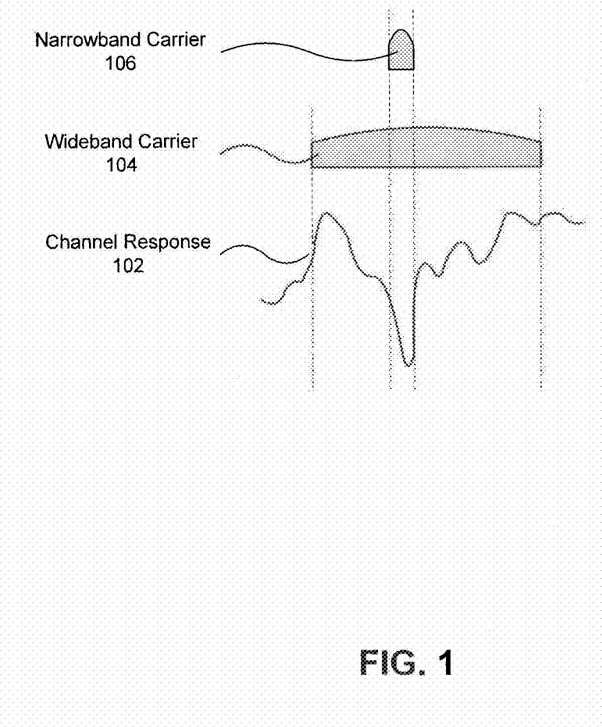
FIG. 1 illustrates examples of both a relatively wideband carrier and a relatively narrowband carrier transmitted over a time dispersive channel.

To provide a specific example of a multi-antenna technique, it is known that a signal transmitted over a radio channel is corrupted due to time dispersion. Time dispersion occurs when the transmitted signal propagates to a receiver over the radio channel via multiple, independently fading paths with different delays. As shown in FIG. 1, such a time dispersive channel corresponds to a non-flat channel response 102 in the frequency domain.

In the case where the transmitted signal uses a relatively wideband carrier 104, each symbol carried by the signal will be transmitted over frequencies of the time dispersive channel with both good quality (high signal strength) and bad quality (low signal strength). As a result, these symbols are said to experience frequency diversity. On the other hand, in the case where the transmitted signal uses a relatively narrowband carrier 106, such as those used in orthogonal frequency division multiplexing (OFDM) transmission, each symbol carried by the signal will experience comparatively less frequency diversity. As a result, the symbols can be confined to transmission over frequencies of the time dispersive channel with only bad quality (low signal strength), leading to a poor error-rate performance at the receiver.

The multi-antenna technique of diversity can be used to improve performance in such an instance. For example, in at least one application, diversity refers to the different fading experienced by signals transmitted from transmit antennas that are spatially separated. This diversity in fading can be exploited to create artificial frequency diversity by transmitting the same narrowband carrier 106 with different relative delays from the multiple transmit antennas. Importantly, the radio channel needs to be estimated at the receiver to take advantage of the artificially created frequency diversity when decoding the symbols carried by the narrowband carrier 106. In particular, the receiver needs to estimate the radio channel and apply its inverse response to take advantage of the artificially created frequency diversity when decoding the symbols carried by the narrowband carrier 106.

In general, many of the multi-antenna techniques that fall within the three categories mentioned above (i.e., diversity, interference suppression, and spatial multiplexing) need to perform channel estimation to improve performance. Depending on the specific multi-antenna technique implemented, the channel estimates can be required at the receiver and/or the transmitter. Channel estimation is typically performed using a training-based method where known symbols, referred to as reference symbols or pilot symbols, are transmitted to a receiver to aid in its estimation of the channel. When there are multiple transmit antennas, the signal received by a receive antenna is a superposition of the signals transmitted form each of the transmit antennas. Thus, the reference symbols transmitted from each of the multiple transmit antennas generally need to be transmitted such that they do not interfere with each other in order to accurately estimate the channel.

Figure 2:
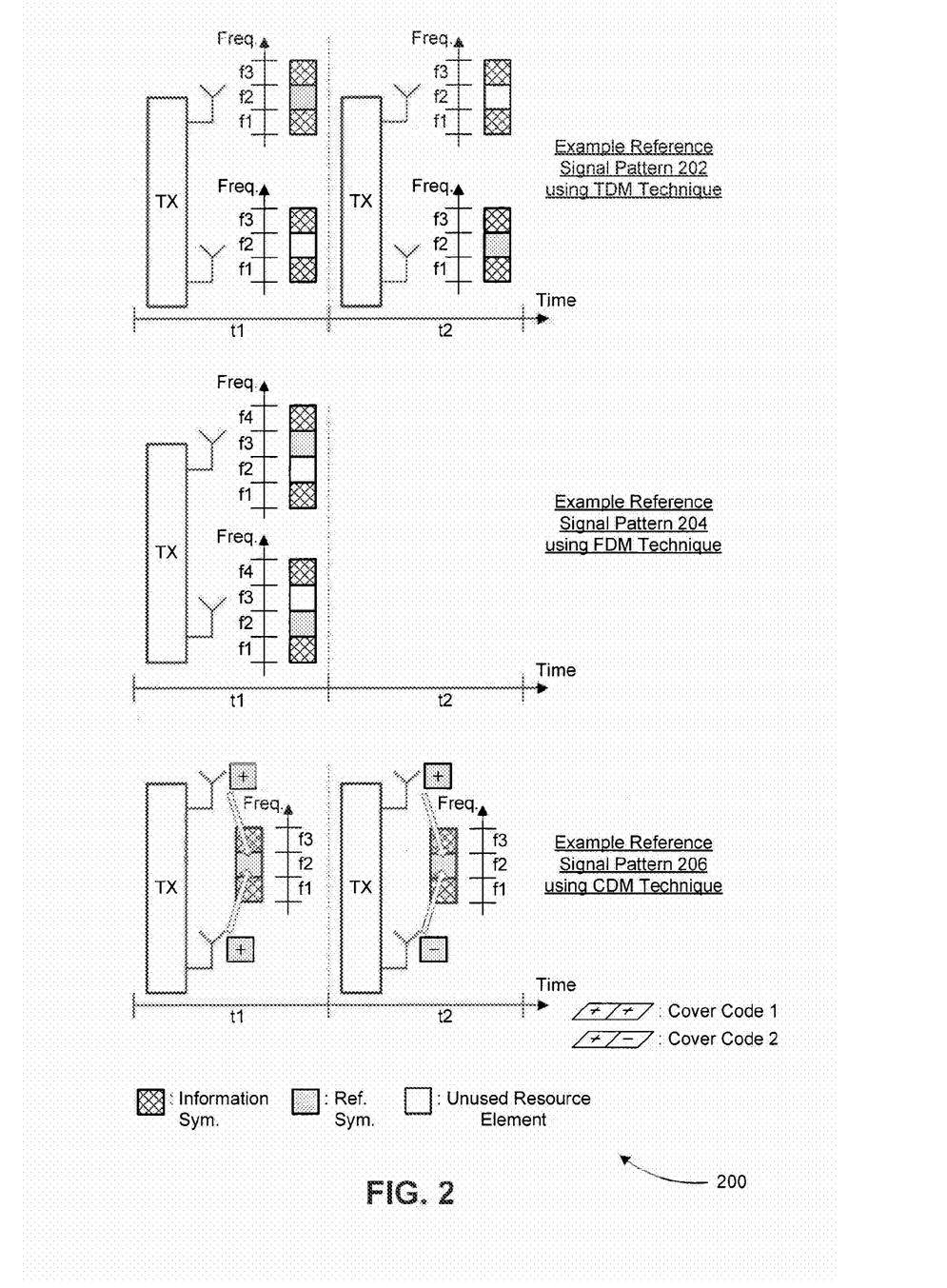
FIG. 2 illustrates three example reference signal patterns that use different multiplexing techniques to reduce interference between multiple transmit antennas.

FIG. 2 illustrates three example reference signal patterns 200 that use different multiplexing techniques to prevent interference between reference symbols transmitted from multiple transmit antennas so that accurate channel estimation can be performed. The three example reference signal patterns 200 respectively use a time division multiplexing (TDM) technique, a frequency division multiplexing (FDM) technique, and a code division multiplexing (CDM) technique.

Using a TDM technique, reference symbols are transmitted from one transmit antenna at a time over the same frequency. An example reference signal pattern 202 that uses a TDM technique is shown at the top of FIG. 2 for two transmit antennas. During a first symbol time period t1, the top transmit antenna transmits a reference symbol over frequency f2, while the bottom transmit antenna transmits nothing over frequency f2. During a second symbol time period t2, the bottom transmit antenna takes its turn transmitting a reference symbol over frequency f2, while the bottom transmit antenna transmits nothing over frequency f2. Because the reference symbols are respectively transmitted from the two transmit antennas one at a time over frequency f2, the reference symbols are orthogonal to each other in the time domain and do not interfere with each other.

Using a FDM technique, reference symbols are transmitted from transmit antennas at the same time but over different frequencies. An example reference signal pattern 204 that uses a FDM technique is shown in the middle of FIG. 2 for two transmit antennas. During a symbol time period t1, the top transmit antenna transmits a reference symbol over frequency f3 but nothing over frequency f2, while the bottom transmit antenna transmits a reference symbol over frequency f2 but nothing over frequency f3. Because the reference symbols are respectively transmitted by the two transmit antennas over different frequencies during the same symbol time period t1, the reference symbols are orthogonal to each other in the frequency domain and do not interfere with each other.

Finally, using a CDM technique, reference symbols are transmitted from transmit antennas over the same frequency and symbol time periods using mutually orthogonal cover codes. An example reference signal pattern 206 that uses a CDM technique is shown at the bottom of FIG. 2 for two transmit antennas. During a first symbol time period t1 and a second symbol time period t2, both the top and bottom transmit antennas transmit two reference symbols (one per symbol time period) over the frequency f2. The top transmit antenna respectively applies the cover code +1, +1 (labeled as cover code 1 in FIG. 2) to the two reference symbols it transmits, and the bottom transmit antenna respectively applies the cover code +1, −1 (labeled as cover code 2 in FIG. 2) to the two reference symbols it transmits. Because cover codes 1 and 2 are mutually orthogonal, the two reference symbols transmitted from each antenna can be separated from each other, assuming the channel is substantially fixed over the symbol time periods t1 and t2.

Standardized wireless communication systems, such as 3GPP long-term Evolution (LTE), use predefined reference signal patterns to support channel estimation. These patterns typically use some combination of TDM, FDM, and potentially CDM to define some number of reference signals (i.e., signals made up of one or more reference symbols) that can each be transmitted by a different transmit antenna without interfering with one another at a receive antenna. Using the three techniques of TDM, FDM, and CDM alone, the predefined reference signal patterns of these standardized wireless communication systems often cannot be extended to define many (if any at all) additional reference signals without using additional resource elements (where a resource element corresponds to the resource of one available carrier/tone over one symbol period). Using additional resource elements is disadvantageous because these resource elements can no longer be used to carry information symbols and their addition to an existing reference signal pattern can cause backward compatibility issues with older devices operating within these systems.

However, it is expected that new releases of standardized wireless communication systems will continue to increase the number transmit antennas used to perform multi-antenna techniques, causing a corresponding need to extend their predefined reference signal patterns to define further reference signals that do not interfere with each other to perform channel estimation. For example, it is expected that the new releases of the 3GPP LTE wireless standard (release 12 and beyond) will support, for example, 16, 32, 64, or more transmit antennas at a base station for performing multi-antenna techniques, or what has been referred to as massive MIMO given the large number of antennas to be used. It is also possible that in a new release a user equipment (UE) or terminal will support more transmit antennas.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

The present disclosure is directed to a system and method for extending a reference signal pattern to define additional reference signals using a phase division multiplexing (PDM) technique. In one embodiment, the reference signal pattern is a predefined reference signal pattern in a wireless communication standard and is extended, for example, to support massive MIMO communication. These and other features of the present disclosure are described further below.

It should be noted that each "transmit antenna" referred to below is considered to correspond to a unique antenna port. It should be further noted that where channel estimation is said to be performed below, channel state information can potentially be acquired instead.

2. Reference Signal Pattern Design Using Phase Division Multiplexing (PDM)

Figure 3:
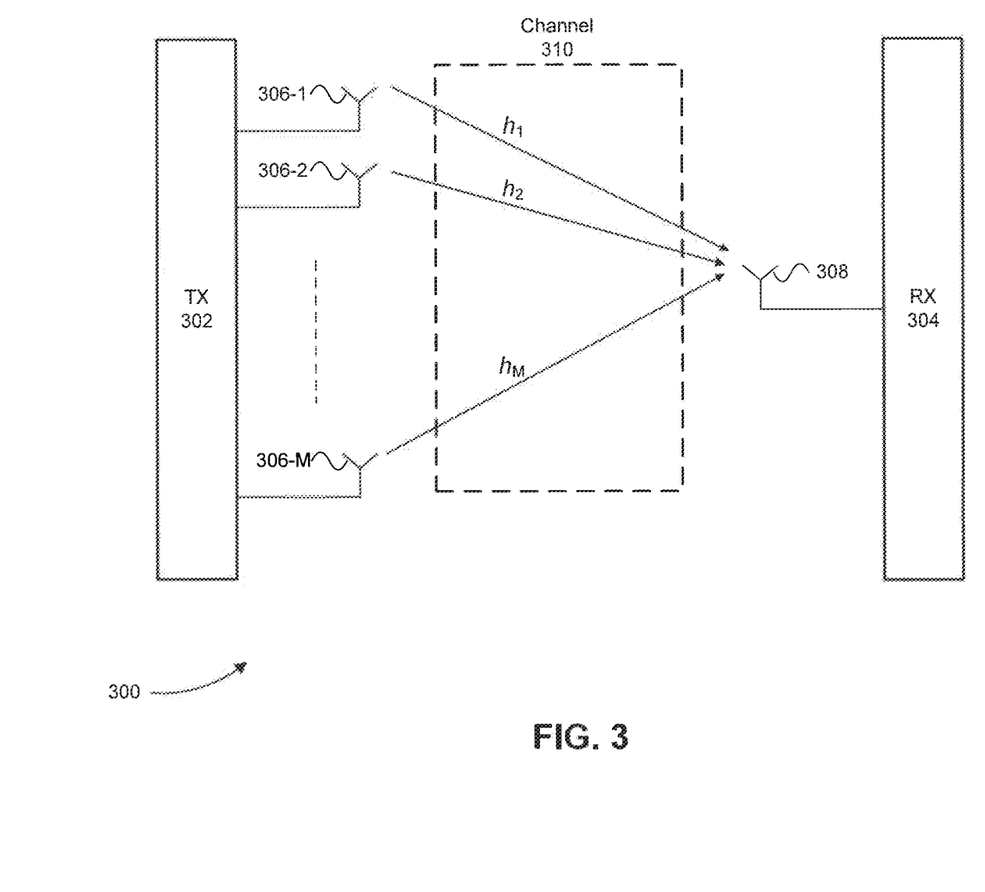
FIG. 3 illustrates a multi-antenna communication system in accordance with embodiments of the present disclosure.

FIG. 3 illustrates an example, multi-antenna wireless communication system 300 that can be used to describe reference signal pattern design using PDM. As shown in FIG. 3, the multi-antenna wireless communication system 300 includes a transmitter 302 with M transmit antennas 306 and a receiver 304 with at least one receive antenna 308. The transmit antennas 306 transmit information to the receive antenna 308 over one or more carrier frequencies using a multi-antenna technique. In order to better perform the multi-antenna technique, the channel 310 between the transmit antennas 306 and the receive antenna 308 can be estimated. At a carrier frequency f, the channel 310 can be represented in the frequency domain by:

$$H(f) = [h_1(f) h_2(f) \ldots h_M(f)] \quad (1)$$

where the individual channel elements $h_1$–$h_M$ are assumed flat over the bandwidth of the carrier at frequency f.

To estimate H(f), a reference signal pattern that defines M reference signals can be designed using a phase division multiplexing (PDM) technique. Using a PDM technique, each of the M reference signals are transmitted from a different one of the transmit antennas 306 over (at least) M resource elements. The (at least) M resource elements associated with each reference signal correspond to each other such that the M reference signals overlap in time and frequency when transmitted. In general, the PDM technique prevents interference between the M reference signals (or at least allows them to be separated at a receiver) by applying a different phase shift to each reference signal over the M resource elements. Once received by the receive antenna 308, the receiver 304 can use the M reference signals to estimate H(f) or some portion of H(f).

Figure 4:
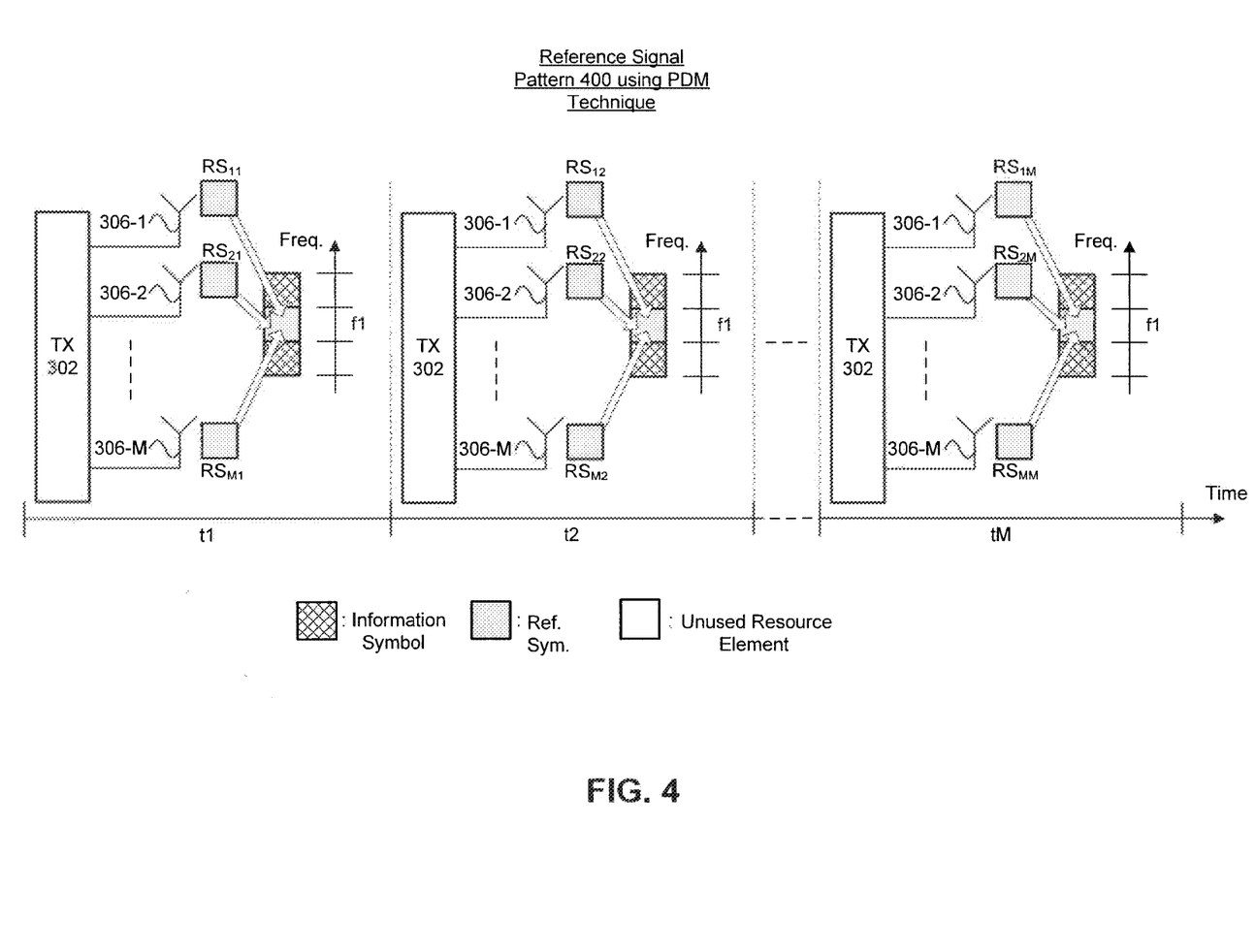
FIG. 4 illustrates a reference signal pattern that uses a phase division multiplexing (PDM) technique in accordance with embodiments of the present disclosure.

FIG. 4 illustrates a specific example of such a reference signal pattern 400 designed using a PDM technique to estimate H(f) at the carrier frequency f1 in accordance with embodiments of the present disclosure. As shown, during M symbol time periods t1-tM (which do not have to be consecutive), the transmit antennas 306 each transmit a different reference signal made up of M reference symbols over the carrier frequency f1. More specifically, the transmit antenna 306-1 transmits a reference signal made up of reference symbols $RS_{11}$, $RS_{12}$, ..., $RS_{1M}$ over the carrier frequency f1, the transmit antenna 306-2 transmits a reference signal made up of reference symbols $RS_{21}$, $RS_{22}$, ..., $RS_{2M}$ over the carrier frequency f1, etc.

It should be noted that the single carrier frequency f1 is used for exemplary purposes and that in other embodiments respective ones of the M reference symbols that make up each of the reference signals can be transmitted over other carrier frequencies to further estimate H(t) at these other carrier frequencies. For example, the second reference symbol of each reference signal $RS_{12}$, $RS_{22}$, ..., $RS_{M2}$ can be transmitted over the carrier frequency f2 to further estimate H(f) at the carrier frequency f2. It should be further noted that in the instance where two or more carrier frequencies are used, respective ones of the M reference symbols that make up each of the reference signals can be transmitted at the same symbol time periods but over the different, two or more carrier frequencies. For example, the second reference symbol of each reference signal $RS_{12}$, $RS_{22}$, ..., $RS_{M2}$ can be transmitted over the carrier frequency f2 at the same symbol time period t1 as the first reference symbol of each reference signal $RS_{11}$, $RS_{21}$, ..., $RS_{M1}$.

To prevent the reference signals from interfering with one another, each of the M reference symbols transmitted over the same symbol time period and frequency are all multiplied by a different respective phase shift. These phase shifts are given by:

$$C(f)_i = \left[ e^{-j2\pi f(\frac{\tau_{1i}}{N})} e^{-j2\pi f(\frac{\tau_{2i}}{N})} \ldots e^{-j2\pi f(\frac{\tau_{Mi}}{N})} \right]^T, \quad (2)$$
$$i = \{1, \ldots, M\}$$

where the superscript T denotes transpose, N is the number of frequency domain carriers (or subcarriers) transmitted by each of the transmit antennas 306, f is the index of the carrier over which the reference symbols are transmitted, i is the index of the symbol time period that the phase shifts correspond, and $\tau_{1i}$, ..., $\tau_{Mi}$ denote different cyclic time-delays respectively applied to the different transmit antennas 306.

Because we are estimating the channel 310 using only the particular carrier frequency f1 in the example above, $C(f)_i$ can be rewritten as $C_i$ for ease of description.

In response to the above described reference symbols being transmitted, the receive antenna 308 will receive M reference symbols during respective symbol time periods over the carrier frequency f1. The first received reference symbol will correspond to the superposition of the reference symbols $RS_{11}$, $RS_{21}$, ..., $RS_{M1}$ that were respectively transmitted by the transmit antennas 306 during the first symbol time period t1, the second received reference symbol will correspond to the superposition of the reference symbols $RS_{12}$, $RS_{22}$, ..., $RS_{M2}$ that were respectively transmitted by the transmit antennas 306 during the second symbol time period t2, etc.

Assuming that H does not substantially change over the symbol time periods t1 through tM and (for ease of explanation) that there is no noise or interference, each of the M reference symbols received by the receive antenna 308 can be represented in the frequency domain by the following:

$$y_i = HC_i p_i, i = \{1, \ldots, M\} \quad (3)$$

where $p_i$ is the reference signal on the RE in time symbol ti. If $C_i$ is known at the receiver 304 for all i, than from equation (3) above there are M equations and M unknowns (i.e., the M individual channel elements $h_1$-$h_M$ of H at f1). Thus, the receiver 304 can estimate H at f1 using, for example, the following zero forcing function:

$$H = y_i p_i^* C_i^* (C_i \times C_i)^{-1}, i = \{1, \ldots, M\} \quad (4)$$

It should be noted that the zero forcing function in equation (4) represents only one function for estimating H and that other methods for estimating H are possible as would be appreciated by one of ordinary skill in the art. It should be further noted that the receiver can learn of $C_i$ for all i by receiving information about the particular cyclic time-delays $\tau_{1i}$, ..., $\tau_{Mi}$ from the transmitter 302 over a control channel, higher layer signaling, pre-defined sets, or by some other means.

3. Extending Reference Signal Patterns Using PDM

The system and method of the present disclosure are configured to use the PDM technique described above to extend a reference signal pattern to define additional reference signals and, thereby, support channel estimation for a larger number of transmit antennas. The reference signal pattern can be, for example, a predefined reference signal pattern in a wireless communication standard and can be extended, for example, to support massive MIMO communication.

Figure 5:
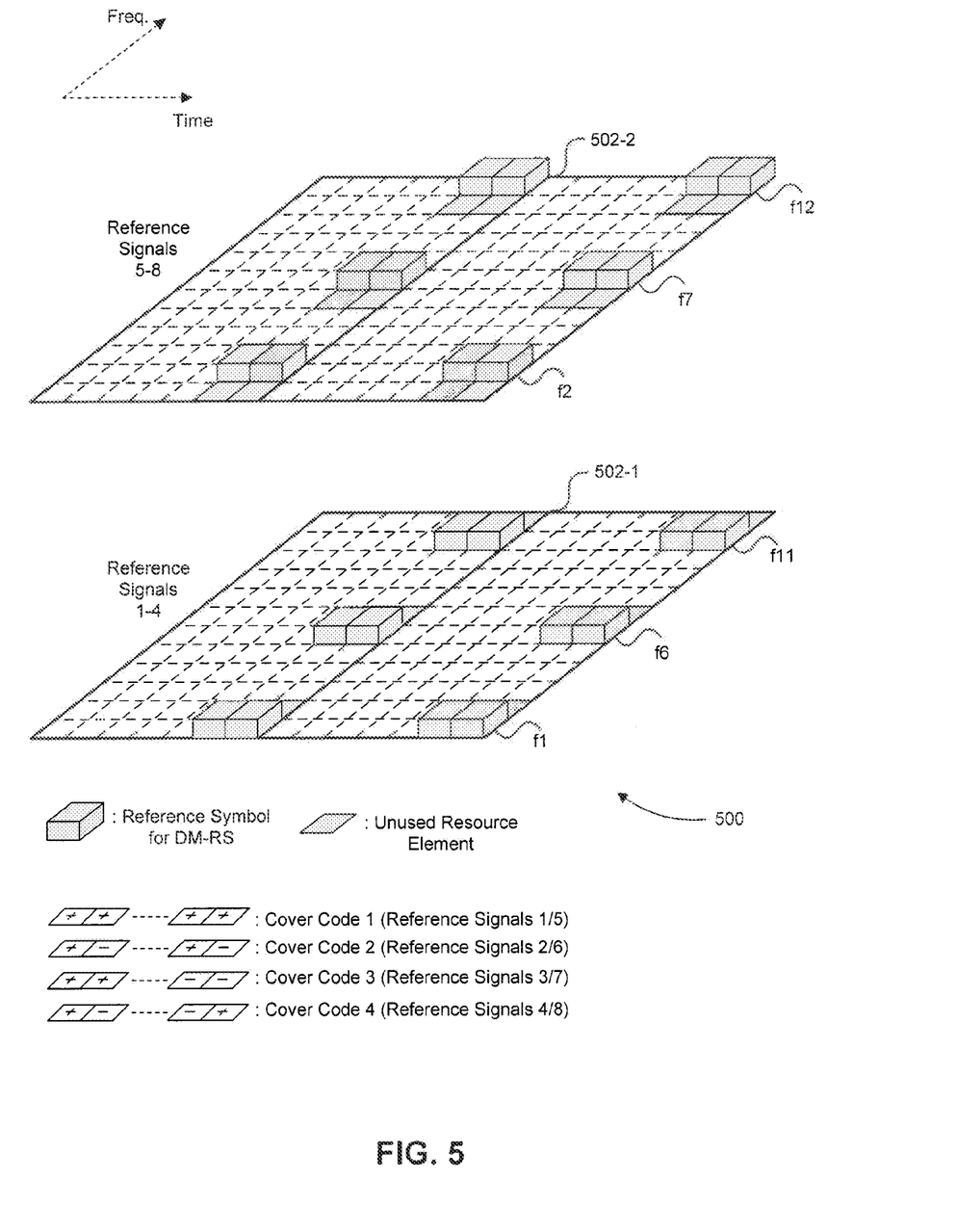
FIG. 5 illustrates a predefined reference signal pattern.

To provide an example, consider the reference signal pattern 500 illustrated in FIG. 5. This reference signal pattern 500 corresponds to a predefined reference signal pattern in the 3GPP LTE wireless communication standard that defines eight different reference signals, each of which are referred to as a downlink demodulation reference signal. The reference signal pattern 500 uses a frequency/time/code division multiplexing technique to prevent interference between the eight different reference signals that it defines. In particular, the eight different reference signals are frequency multiplexed into two groups of four reference signals as shown by the resource-block pair diagrams 502-1 and 502-2 (each of which depicts resource elements over the same 14 symbol time periods and 12 subcarrier frequencies). More specifically, reference signals 1-4 are assigned to one group and are transmitted over frequencies f1, f6, and f11, and reference signals 5-8 are assigned to the other group and are transmitted over frequencies f2, f7, and f12. Because reference signals 1-4 are transmitted over different frequencies than reference signals 5-8, the two groups of reference signals do not interfere with each other.

All 12 reference symbols shown in the resource-block pair diagram 502-1 are transmitted for each of the four reference signals 1-4, and all 12 reference symbols shown in the resource-block pair diagram 502-2 are transmitted for each of the four reference signals 5-8. Interference is prevented between the 12 overlapping reference symbols in each of the resource-block pairs 502 by applying four mutually orthogonal cover codes (shown at the bottom of FIG. 5). More specifically, a different one of the four mutually orthogonal cover codes is applied to: (1) the four reference symbols transmitted by each reference signal 1-4 over frequency f1; (2) the four reference symbols transmitted by each reference signal 1-4 over frequency f6; and (3) the four reference symbols transmitted by each reference signal 1-4 over frequency f11. Similarly, a different one of the four mutually orthogonal cover codes is applied to: (1) the four reference symbols transmitted by each reference signal 5-8 over frequency f2; (2) the four reference symbols transmitted by each reference signal 5-8 over frequency f7; and (3) the four reference symbols transmitted by each reference signal 5-8 over frequency f12.

Figure 6:
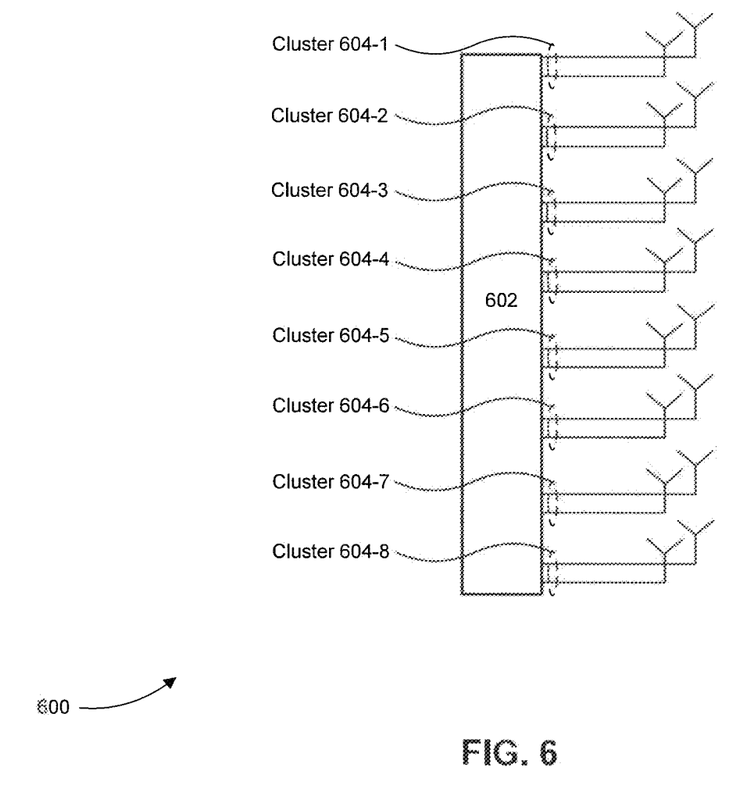
FIG. 6 illustrates a transmitter with 16 transmit antennas that have been grouped into clusters in accordance with embodiments of the present disclosure.

The system and method of the present disclosure can extend the reference signal pattern 500 to define additional reference signals so that channel estimation can be performed for more than the currently supported eight transmit antennas. Specifically, for greater than eight transmit antennas, the transmit antennas can be grouped into clusters of one or more antennas such that the number of clusters is less than or equal to the number of distinct reference signals defined by the reference signal pattern 500 or eight in this case. Thus, for example, assume it is desired to support channel estimation for 12 transmit antennas using the 8 distinct reference signals defined by reference signal pattern 500. In one embodiment, two clusters of three transmit antennas and six clusters of one transmit antenna can be formed, for example, such that the total number of clusters is equal to eight. In another embodiment, four clusters of three transmit antennas can be formed. FIG. 6 illustrates another example 600 where 16 transmit antennas at a transmitter 602 are grouped into eight clusters 604 of two transmit antennas each.

After the transmit antennas are grouped into clusters, each antenna cluster can be assigned to transmit a different one of the distinct reference signals defined by the reference signal 00. For example, assume it is desired to use the reference signal pattern 500 to perform channel estimation for the 16 transmit antennas shown in FIG. 6, which have been grouped into eight clusters 604 of two transmit antennas each. In this instance, each cluster 604 can be assigned to transmit a distinct and different one of the eight reference signals defined by the original reference signal pattern 500.

To prevent the reference signals transmitted by each antenna within one of the clusters 604 from interfering with each another, the PDM technique described above in Section 2 can be used. Specifically, different phase shifts as described above in Section 2 can be applied to the different reference signals transmitted by each antenna within a cluster to prevent the reference signals from interfering with one another. A receiver with knowledge of the phase shifts used for each cluster can then estimate the full (or, if desired, partial) channel for all of the transmit antennas in the clusters using the reference signals once received.

Figure 7:
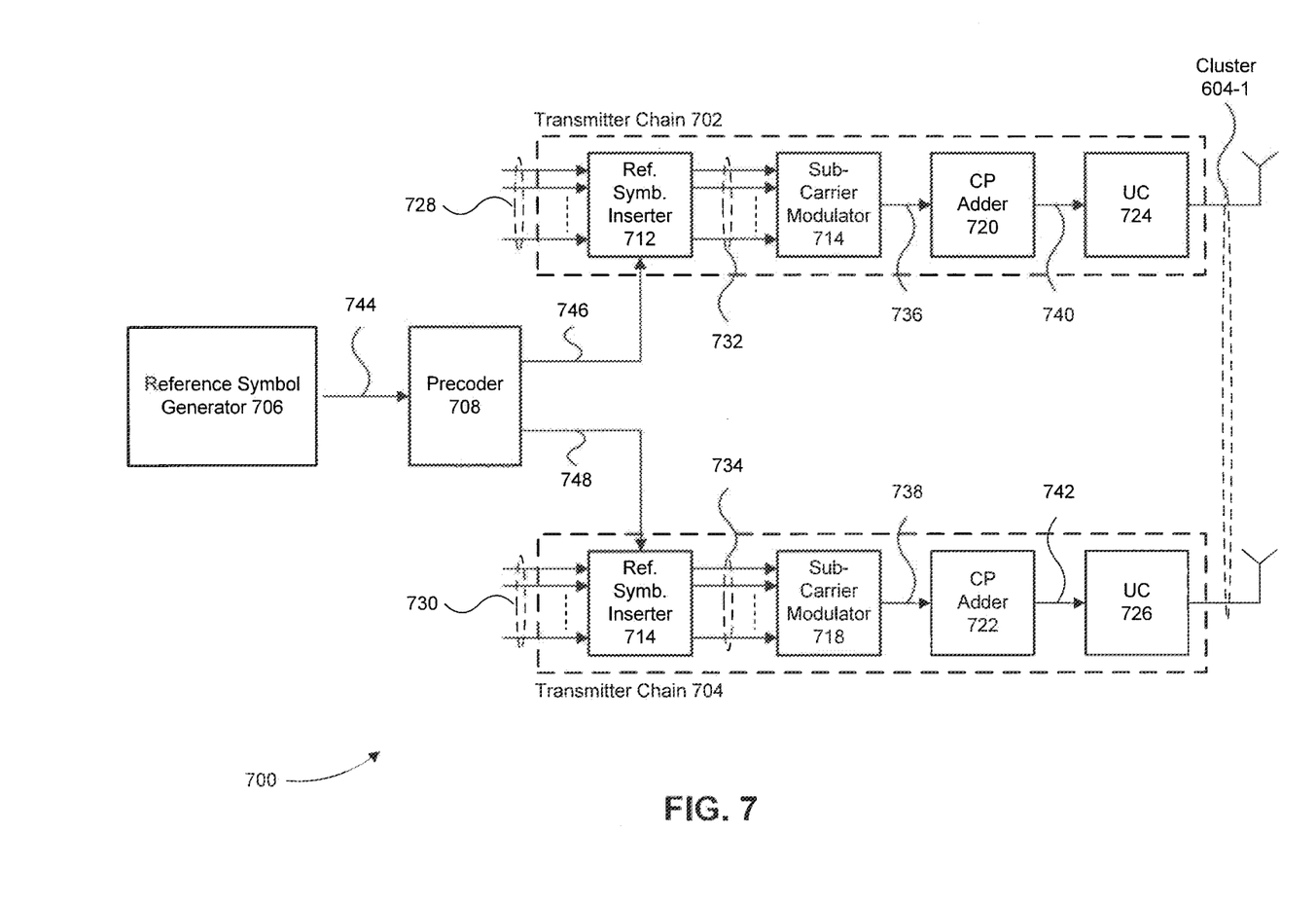
FIG. 7 illustrates a portion of a multi-antenna transmitter in accordance with embodiments of the present disclosure.

To further describe this functionality, FIG. 7 illustrates a portion 700 of the transmitter 602 illustrated in FIG. 6, including two partial transmitter chains 702 and 704, a reference symbol generator 706, and a precoder 708 in accordance with embodiments of the present disclosure. In one embodiment, the portion 700 of the transmitter 602 is implemented in a base station (or Evolved Node B).

As shown in FIG. 7, the two partial transmitter chains 702 and 704 are respectively coupled to the two transmit antennas of cluster 604-1. Each partial transmitter chain 702 and 704 transmits a series of parallel information symbol streams 728 and 730 that can be encoded to perform a multi-antenna technique. The parallel information symbol streams 728 and 730 are respectively modulated onto different subcarriers and output as a series of time-domain symbols 736 and 738 by sub-carrier modulators 714 and 718, which may perform an inverse fast Fourier transform in the case of OFDM transmission and output OFDM symbols. Cyclic-prefix adders 720 and 722 then optionally add cyclic prefixes to the time domain samples 736 and 738 before they are up converted by up converters 724 and 726 and transmitted by the two transmit antennas of the cluster 604-1.

Assuming, for exemplary purposes, that cluster 604-1 is assigned to transmit reference signal 1 defined by the reference signal pattern 500 in FIG. 5, the reference symbol generator 706 can generate the reference symbols 744 for reference signal 1. Reference symbol inserters 712 and 714 (e.g., multiplexors) can then insert the reference symbols 744 into each of the parallel information symbol streams 728 and 730 for transmission at the same particular symbol time periods and frequencies as defined by the reference signal pattern 500. To prevent interference between the reference symbols 744 transmitted by each of the two transmit antennas in the cluster 604-1, therefore, the precoder 708 can be used to implement the PDM technique described above in Section 2. Specifically, the precoder 708 can be used to apply different phase shifts as described above in Section 2 to the reference symbols 744 to be transmitted by each of the two transmit antennas in the cluster 604-1, and also to the reference symbols 744 to be transmitted across different frequencies by each of the two transmit antennas in the cluster 604-1. The precoded reference symbols to be transmitted by each antenna in the cluster 604-1 are respectively labeled as 746 and 748.

For example, consider a reference symbol generated by the reference symbol generator 706 for transmission by each of the two transmit antennas in the cluster 604-1 at the same symbol time period and frequency. Before the reference symbol is transmitted by each of the two transmit antennas in the cluster 604-1, the precoder 708 can apply, as part of the PDM technique, different respective phase shifts to the reference symbol before it is transmitted by each of the two transmit antennas in the cluster 604-1. More specifically, a first phase shift can be applied to the reference symbol transmitted from one of the transmit antennas in the cluster 604-1, and a second phase shift, different from the first, can be applied to the reference symbol transmitted from the other one of the transmit antennas in the cluster 604-1. These phase shifts can be generated in accordance with equation (2) defined in Section 2 above.

It should be noted that other predefined reference signal patterns in the 3GPP LTE standard can be extended as described above. For example, the predefined reference signal patterns that define cell-specific reference signals (CRS) and channel state information reference signals (CSI-RS) can be extended as described above. Moreover, it should be further noted that the predefined reference signal patterns (e.g., CSI-RS) can be extended to specifically support elevation beamforming. Finally, it should be noted that the precoder 708 can be included in the reference symbol generator 706.

Figure 8:
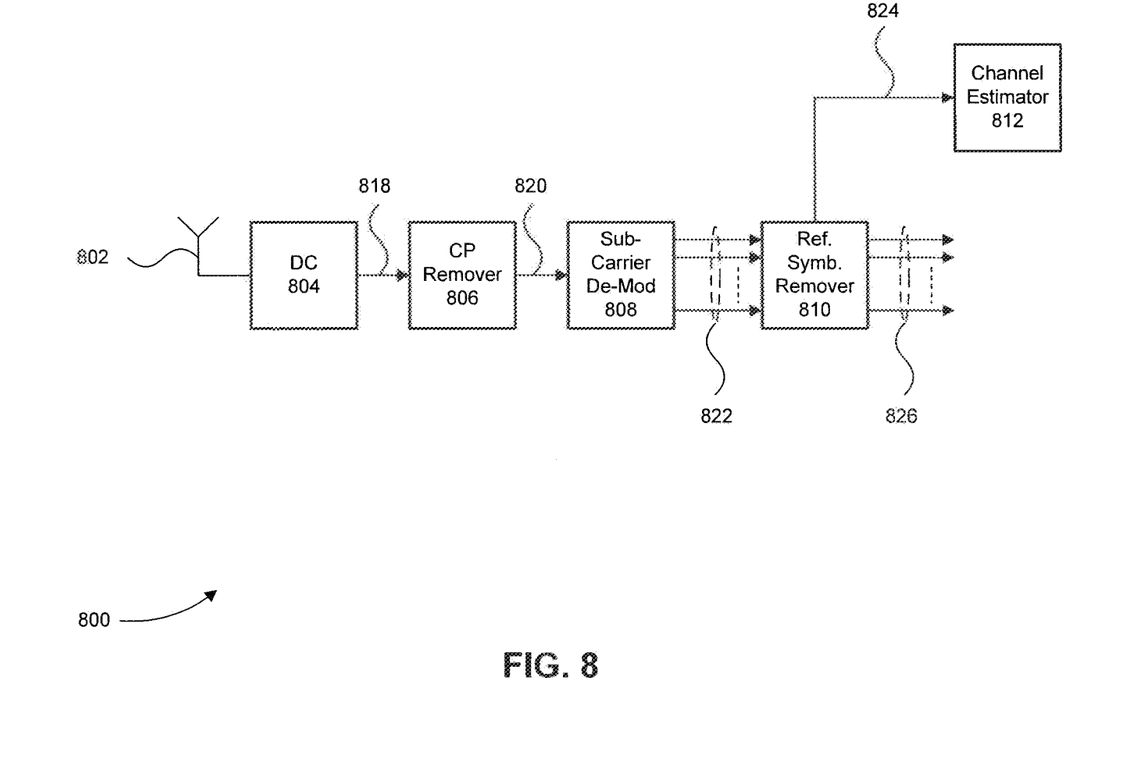
FIG. 8 illustrates a portion of a receiver in accordance with embodiments of the present disclosure.

Referring now to FIG. 8, a partial receiver chain 800 is illustrated in accordance with embodiments of the present invention. The partial receiver chain 800 includes a receive antenna 802, a down converter 804, a cyclic prefix remover 806, a sub-carrier demodulator 808, a reference symbol remover 810, and a channel estimator 812. In one embodiment, the partial receiver chain 800 is implemented in a terminal or user equipment (e.g., a mobile phone, laptop, tablet, etc.).

In general, the partial receiver chain 800 can be used to receive the signals (including the reference signals) transmitted by the antennas in cluster 604-1 shown in FIG. 7 and remove the reference symbols from the received signal for channel estimation. More specifically, the down converter 804 can down covert a signal received by the receive antenna 802 to recover time domain symbols 818. The CP remover 806 can then remove any cyclic prefix from the time domain symbols 818 to produce cyclic-prefix removed time domain symbols 820. The cyclic-prefix removed time domain symbols 820 can then be demodulated by the sub-carrier demodulator 808, which may perform a fast Fourier transform in the case of OFDM transmission, to recover parallel streams of information and reference symbols 822. The reference symbol remover 810 can then remove the reference symbols 824 included in the parallel streams of information and reference symbols 822 and provide them to the channel estimator 812. The channel estimator 812 can then use knowledge of the phase shifts applied to the different reference symbols transmitted by the transmitter 602 as part of the PDM technique to, at least in part, perform channel estimation.

Figure 9:
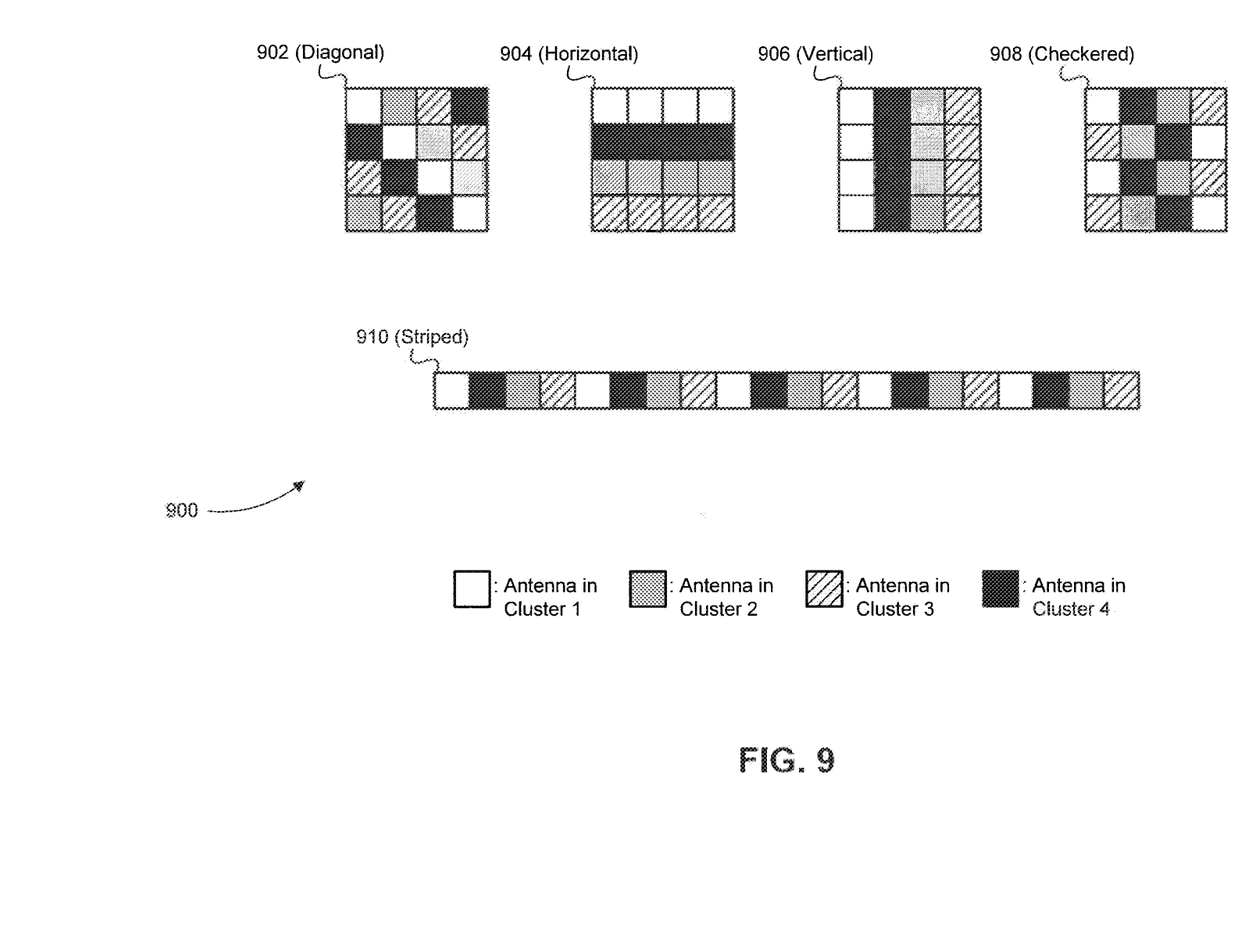
FIG. 9 illustrates different antenna cluster patterns in accordance with embodiments of the present disclosure.

Referring now to FIG. 9, different antenna cluster patterns 900 are shown in accordance with embodiments of the present disclosure. These antenna cluster patterns 900 can be used to select which antennas at a transmitter are used to form different clusters for extending a reference signal pattern as discussed above.

For example, assuming a rectangular array of antennas at the transmitter, four different types of antenna cluster patterns 902, 904, 906, and 908 can be used to select which antennas at the transmitter form different clusters. The first antenna cluster pattern 902 uses a diagonal pattern, where antennas belonging to clusters are selected across different diagonal lines of antennas in the rectangular array. The second antenna cluster pattern 904 uses a horizontal pattern, where antennas belonging to clusters are selected across different horizontal lines of antennas in the rectangular array. The third antenna pattern 906 uses a vertical pattern, where antennas belonging to clusters are selected across different vertical lines of antennas in the rectangular array. Finally, the fourth antenna pattern 908 uses a checkered pattern as shown in FIG. 9. Assuming a linear array of antennas at the transmitter, an antenna pattern 910 that uses a striped pattern as shown in FIG. 9 can be further used.

It should be noted that the antenna cluster patterns 900 can be used in conjunction with other antenna cluster patterns, other numbers of antennas (i.e., other than 16) at a transmitter, and clusters with non-uniform sizes and sizes other than four antennas per cluster.

4. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A transmitter comprising:
a reference symbol generator configured, as part of a phase division multiplexing technique, to apply first phase shifts to reference symbols of a first reference signal to produce first phase shifted reference symbols and to apply second phase shifts to the reference symbols of the first reference signal to produce second phase shifted reference symbols;
a first reference symbol inserter configured to insert the first phase shifted reference symbols into a first stream of information symbols for transmission by a first antenna over a frequency and a plurality of symbol time periods; and
a second reference symbol inserter configured to insert the second phase shifted reference symbols into a second stream of information symbols for transmission by a second antenna over the frequency and the plurality of symbol time periods,
wherein the first antenna and the second antenna are grouped into a first cluster as part of the phase division multiplexing technique, and
wherein the first and second phase shifted reference symbols are time, frequency, and code division multiplexed with third and fourth phase shifted reference symbols respectively transmitted by third and fourth antennas of the transmitter grouped into a second cluster as part of the phase division multiplexing technique.

2. The transmitter of claim 1, wherein the first antenna and the second antenna are selected, as part of the phase division multiplexing technique, based on a position of the first antenna and a position of the second antenna in an antenna array at the transmitter.

3. The transmitter of claim 1, wherein the third and fourth phase shifted reference symbols are generated from reference symbols of a second reference signal.

4. The transmitter of claim 1, wherein the first phase shifted reference symbols are transmitted from the first antenna in a first set of orthogonal frequency division multiplexing symbols, and the second phase shifted reference symbols are transmitted from the second antenna in a second set of orthogonal frequency division multiplexing symbols.

5. The transmitter of claim 1, wherein the first phase shifts are determined based on $$e^{-j2\pi f \frac{\tau_{0i}}{N}},$$

and the second phase shifts are determined based on $$e^{-j2\pi f \frac{\tau_{1i}}{N}},$$

where f is the frequency over which the first and second phase shifted reference symbols are transmitted, N is a number of frequency domain carriers, i is a symbol time period index, and $\tau_{0i}$ and $\tau_{1i}$ are different cyclic shift values.

6. The transmitter of claim 1, wherein the first stream of information symbols and the second stream of information symbols are encoded to perform a multi-antenna technique using the first antenna and the second antenna.

7. The transmitter of claim 6, wherein the multi-antenna technique is diversity, interference suppression, or spatial multiplexing.

8. A transmitter comprising:
a reference symbol generator configured to, as part of a phase division multiplexing technique used to extend a predefined reference signal pattern in a communication standard, apply a first phase shift to a reference symbol of a first reference signal of the predefined reference signal pattern to produce a first phase shifted reference symbol and apply a second phase shift to the reference symbol of the first reference signal to produce a second phase shifted reference symbol;
a first reference symbol inserter configured to insert the first phase shifted reference symbol into a first stream of information symbols for transmission by a first antenna at a symbol time period and frequency; and
a second reference symbol inserter configured to insert the second phase shifted reference symbol into a second stream of information symbols for transmission by a second antenna at the symbol time period and frequency,
wherein the first antenna and the second antenna are grouped into a first cluster as part of the phase division multiplexing technique, and
wherein the first and second phase shifted reference symbols are time, frequency, and code division multiplexed with third and fourth phase shifted references symbols respectively transmitted by third and fourth antennas of the transmitter grouped into a second cluster as part of the phase division multiplexing technique.

9. The transmitter of claim 8, wherein the first antenna and the second antenna are selected, as part of the phase division multiplexing technique, based on a position of the first antenna and a position of the second antenna in an antenna array at the transmitter.

10. The transmitter of claim 8, wherein the third phase shifted reference symbol and fourth phase shifted reference symbol are both generated from a reference symbol of a second reference signal of the predefined reference signal pattern.

11. The transmitter of claim 8, wherein the antennas of the first cluster are selected across a different diagonal, horizontal, or vertical line of antennas in a rectangular antenna array at the transmitter than the antennas of the second cluster.

12. The transmitter of claim 8, wherein the antennas of the first and second clusters are selected according to a striped pattern from a linear antenna array at the transmitter.

13. The transmitter of claim 8, wherein the first cluster has a different number of antennas than the second cluster.

14. The transmitter of claim 1, wherein the antennas of the first cluster are selected across a different diagonal, horizontal, or vertical line of antennas in a rectangular antenna array at the transmitter than the antennas of the second cluster.

15. The transmitter of claim 1, wherein the antennas of the first and second clusters are selected according to a striped pattern from a linear antenna array at the transmitter.

16. The transmitter of claim 1, wherein the first cluster has a different number of antennas than the second cluster.

17. The transmitter of claim 1, wherein the plurality of symbol time periods are not consecutive.

18. A transmitter comprising:
a first cluster of antennas each configured to transmit a first reference symbol over a frequency and a symbol time period, wherein the first reference symbol transmitted by each antenna in the first cluster of antennas are phase division multiplexed to prevent interference between transmissions from the first cluster of antennas over the frequency and the symbol time period, and
a second cluster of antennas each configured to transmit a second reference symbol over the frequency and the symbol time period, wherein the second reference symbol transmitted by each antenna in the second cluster of antennas are phase division multiplexed to prevent interference between transmissions from the second cluster of antennas over the frequency and the symbol time period,
wherein the transmissions from the first cluster of antennas over the frequency and the symbol time period are code division multiplexed with the transmissions from the second cluster of antennas over the frequency and the symbol time period.

19. The transmitter of claim 18, wherein the first cluster of antennas are selected across a different diagonal, horizontal, or vertical line of antennas in a rectangular antenna array at the transmitter than the second cluster of antennas.

20. The transmitter of claim 18, wherein the first cluster of antennas and the second cluster of antennas are selected according to a striped pattern from a linear antenna array at the transmitter.

* * * * *